(12) United States Patent
Muff et al.

(10) Patent No.: US 8,892,851 B2
(45) Date of Patent: Nov. 18, 2014

(54) CHANGING OPCODE OF SUBSEQUENT INSTRUCTION WHEN SAME DESTINATION ADDRESS IS NOT USED AS SOURCE ADDRESS BY INTERVENING INSTRUCTIONS

(75) Inventors: Adam J. Muff, Rochester, MN (US);
Paul E. Schardt, Rochester, MN (US);
Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 13/287,412

(22) Filed: Nov. 2, 2011

(65) Prior Publication Data
US 2013/0111190 A1 May 2, 2013

(51) Int. Cl.
*G06F 9/318* (2006.01)
*G06F 9/30* (2006.01)

(52) U.S. Cl.
CPC .............. *G06F 9/30* (2013.01); *G06F 9/30145* (2013.01); *G06F 9/30181* (2013.01)
USPC .. 712/226; 712/208; 712/E9.028; 712/E9.035

(58) Field of Classification Search
CPC ... G06F 9/30; G06F 9/30181; G06F 9/30145; G06F 9/30156
See application file for complete search history.

(56) References Cited

U.S. PATENT DOCUMENTS

| | | | |
|---|---|---|---|
| 8,255,674 B2 * | 8/2012 | Hickey et al. | 712/226 |
| 2010/0042812 A1 * | 2/2010 | Hickey et al. | 712/208 |

* cited by examiner

*Primary Examiner* — Kenneth Kim
(74) *Attorney, Agent, or Firm* — Wood, Herron & Evans, LLP

(57) ABSTRACT

A circuit arrangement and method support compression and expansion of instruction opcodes by detecting successive address targeting and decoding a first opcode of an instruction into a second opcode in response to detecting successive address targeting. The circuit arrangement and method execute instructions in an instruction stream and detect successive address targeting by two or more instructions in the instruction stream without the targeted address being utilized as a source address in an instruction executed between the first and second instructions in the instruction stream. Then, based on that detection, the opcode of the second instruction is modified, changed, or appended to such that a different opcode is indicated by the second instruction, such that executing the second instruction causes a different unique type of operation to be performed.

22 Claims, 7 Drawing Sheets

CHANGING OPCODE OF SUBSEQUENT INSTRUCTION WHEN SAME DESTINATION ADDRESS IS NOT USED AS SOURCE ADDRESS BY INTERVENING INSTRUCTIONS

FIELD OF THE INVENTION

The invention is generally related to data processing, and in particular to processor architectures and execution units incorporated therein.

BACKGROUND OF THE INVENTION

The fundamental task of every computer processor is to execute computer programs. How a processor handles this task, and how computer programs must present themselves to a processor for execution, are governed by both the instruction set architecture (ISA) and the microarchitecture of the processor. An ISA is analogous to a programming model, and relates principally to how instructions in a computer program should be formatted in order to be properly decoded and executed by a processor, although an ISA may also specify other aspects of the processor, such as native data types, registers, addressing modes, memory architecture, interrupt and exception handling, and external I/O. The microarchitecture principally governs lower level details regarding how instructions are decoded and executed, including the constituent parts of the processor (e.g., the types of execution units such as fixed and floating point execution units) and how these interconnect and interoperate to implement the processor's architectural specification.

An ISA typically includes a specification of the format of each type of instruction that is capable of being executed by a particular processor design. Typically, an instruction will be encoded to include an operational code, or opcode, that identifies the type of instruction, (i.e., the type of operation to be performed when the instruction is executed), as well as one or more operands that identify input and/or output data to be processed by the instruction. In many processor designs, for example Reduced Instruction Set Computer (RISC) and other load-store designs, data is principally manipulated within a set of general purpose registers (GPR's) (often referred to as a "register file"), with load and store instructions used to respectively retrieve input data into GPR's from memory and store result or output data from GPR's and back into memory. Thus, for a majority of the instructions that manipulate data, the instructions specify one or more input or source registers from which input data is retrieved, and an output or destination register to which result data is written.

Instructions are typically defined in an ISA to be a fixed size, e.g., 32 bits or 64 bits in width. While multiple 32 or 64 bit values may be used to specify an instruction, the use of multiple values is undesirable because the multiple values take more time to propagate through the processor and significantly increase design complexity. With these fixed instruction widths, only a limited number of bits are available for use as opcodes and operands.

Each unique instruction type conventionally requires a unique opcode, so in order to support a greater number of instruction types (a continuing need in the industry), additional bits often must be allocated to the opcode portion of an instruction architecture. In some instances, opcodes may be broken into primary and secondary opcodes, with the primary opcode defining an instruction type and the secondary opcode defining a subtype for a particular instruction type; however, even when primary and secondary opcodes are used, both opcodes occupy bit positions in each instruction.

Likewise, a continuing need exists for expanding the number of registers supported by an ISA, since improvements in fabrication technology continue to enable greater numbers of registers to be architected into an integrated circuit, and in general performance improves as the number of registers increases.

Each register requires a unique identifier as well, so as the number of registers increases, the number of bit positions in each instruction required to identify all supported registers likewise increases.

As an example, consider a processor architecture that supports 32-bit instructions with 6-bit primary opcode fields, and thus supports a total of 64 types, or classes of instructions. If, for example, it is desirable to implement within this architecture a class of instructions that identifies up to three source registers and a separate destination register from a register file of 64 registers, each operand requires a 6-bit operand field. As such, 6 bits are needed for the primary opcode, 18 bits are needed for the source register addresses and 6 bits are needed for the target register address, leaving only 2 bits for an extended opcode, and allowing for only four possible instructions in this instruction class.

In most instances, however, more instruction types are needed for an architecture to be useful. For instance, an instruction class for performing floating point operations may need instruction types that perform addition, subtraction, multiplication, fused multiply-add operations, division, exponentiation, trigonometric operations, comparison operations, and others.

Conventional attempts have been made to address these limitations. For example, three-source operations may be made destructive, meaning the target and one source address would be implicitly equal, such that one address field in the above example would not be needed, freeing up space for additional extended opcodes. Destructive operations, however, are often not convenient for compilers and software engineers, because often times an extra copy of the source data that would be overwritten by the destructive operation needs to be saved away in a temporary register, which can have potential performance problems in addition to using valuable temporary register space.

Therefore, a significant need continues to exist in the art for a manner of increasing the number and complexity of instructions supported by an instruction set architecture.

SUMMARY OF THE INVENTION

A circuit arrangement and method support compression and expansion of instruction opcodes by detecting successive address targeting and decoding a first opcode of an instruction into a second opcode in response to detecting successive address targeting. The circuit arrangement and method execute instructions in an instruction stream and detect successive address targeting by two or more instructions in the instruction stream without the targeted address being utilized as a source address in an instruction executed between the first and second instructions in the instruction stream. Then, based on that detection, the opcode of the second instruction is modified, changed, or appended to such that a different opcode is indicated by the second instruction, such that executing the second instruction causes a different unique type of operation to be performed.

As an increasing number of unique types of instructions are desirable in processors consistent with the system, embodiments of the invention may decode the first opcode included in the second instruction into a second opcode based at least in part on the first opcode, the respective address targeted by the second instruction, and/or the number of instructions executed between the first and second instructions. Therefore, in these embodiments, prior to execution of the second instruction, the second opcode may be included in the second instruction in combination with the first opcode or in lieu of the first opcode such that a different unique instruction type may be identified based at least in part on the second instruction without requiring more bits to be utilized for an opcode in the instruction. As such, the amount of bits required for opcodes may be maintained or decreased, while the types of unique instructions defined by unique opcodes may be increased.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

DETAILED DESCRIPTION

Figure 1:
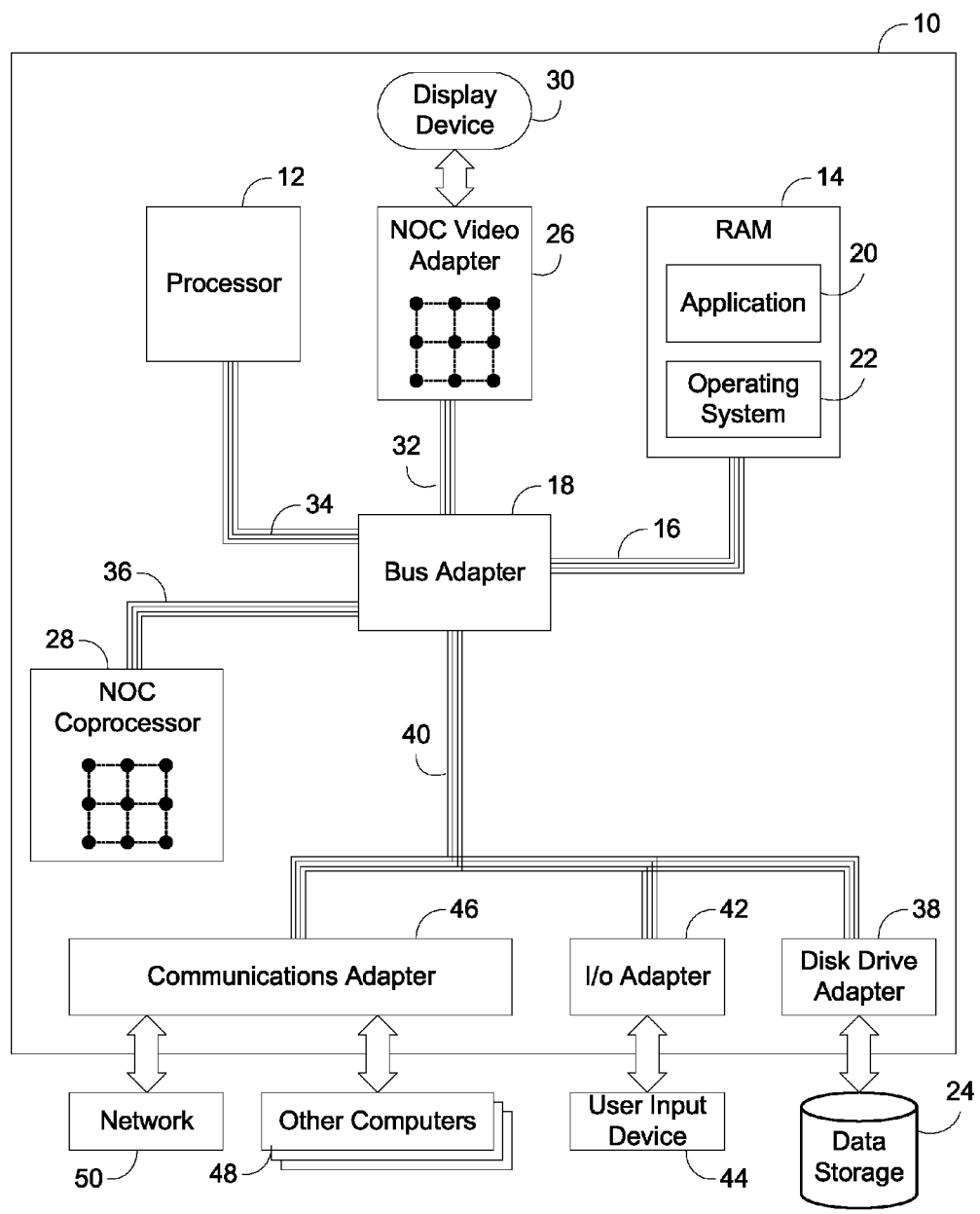
FIG. 1 is a block diagram of exemplary automated computing machinery including an exemplary computer useful in data processing consistent with embodiments of the present invention.

Embodiments consistent with the invention analyze instructions in an instruction stream to identify a respective instruction including a first opcode that targets a previously targeted address before the targeted address has been utilized as a source address. In response to identifying the respective instruction, the first opcode of the respective instruction may be decoded into a second opcode to be executed with the respective instruction, data utilized in decoding the first opcode may be determined consistent with some embodiments of the invention based at least in part on the respective instruction, including for example the target address of the respective instruction, the first opcode (i.e., the original opcode) of the respective instruction, and/or other such data of the respective instruction. As such, to allow for more types of operations identified by more distinct opcodes, embodiments of the invention decode the first opcode as a second opcode to be executed with the respective instruction in response to determining that a respective address has been successively targeted by a previous instruction and the respective instruction in the instruction stream, before the respective address has been utilized as a source by an instruction in the instruction stream. Decoding the second opcode to be executed may be based at least in part on the successively targeted address, the opcode included in the respective instruction, and/or the number of instructions executed between the instructions successively targeting the respective address.

By determining whether an address has been successively targeted before being used as a source address, embodiments of the invention determine previously decoded instructions that may be considered logically non-significant. The previously decoded instructions may be considered logically non-significant because successively targeting a respective address without the respective address being utilized as a source address may indicate that the previously decoded instructions did not generate useful data, i.e., perform useful operations, as indicated by the non-use of the target address as a source address before overwriting the target address.

In some embodiments, detection logic consistent with embodiments of the invention may be configured to determine if a respective address utilized as a target address of a respective instruction has also been utilized as a target address by one or more previously decoded instructions without being used as a source address. In response to determining that the target address of the respective instruction has also been used as a target address by one or more previously decoded instructions without being used as a source address, the detection logic may decode a first opcode indicated by the respective instruction as a second opcode, where decoding the first opcode may be based at least in part on the targeted address, the opcode of the instruction, how many instructions were in between the instructions successively targeting the same address in the instruction stream, and/or other such data indicated by the respective instruction. In some embodiments, the detection logic may decode the first opcode as a second opcode by determining a secondary opcode, while in other embodiments, the detection logic may decode the first opcode as the second opcode by replacing the first opcode with the second opcode or by combining the first opcode and the secondary opcode. In some embodiments, detection logic consistent with the invention may receive a portion of an address not included in the respective instruction, including for example, a portion of a target or source address, where the portion may be included with the respective instruction. As such, in these embodiments, detection logic consistent with embodiments of the invention may support address expansion, thereby reducing the number of bits in an instruction required for address identification.

Therefore, in some embodiments of the invention, a respective instruction of an instruction stream may be analyzed to determine if the target address utilized by the respective instruction was also utilized by a previously decoded instruction without being utilized as a source address by any instructions between the respective instruction and the respective previously decoded instruction. In response to the determination, embodiments of the invention may modify the respective instruction such that extended opcodes and/or secondary opcodes may be utilized with instructions in the instruction stream while maintaining and/or decreasing the number of bits in the instruction used for an opcode consistent with embodiments of the invention, thereby increasing the unique types of instructions identifiable by opcodes.

Other modifications will become apparent to one of ordinary skill in the art having the benefit of the instant disclosure.

Hardware and Software Environment

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
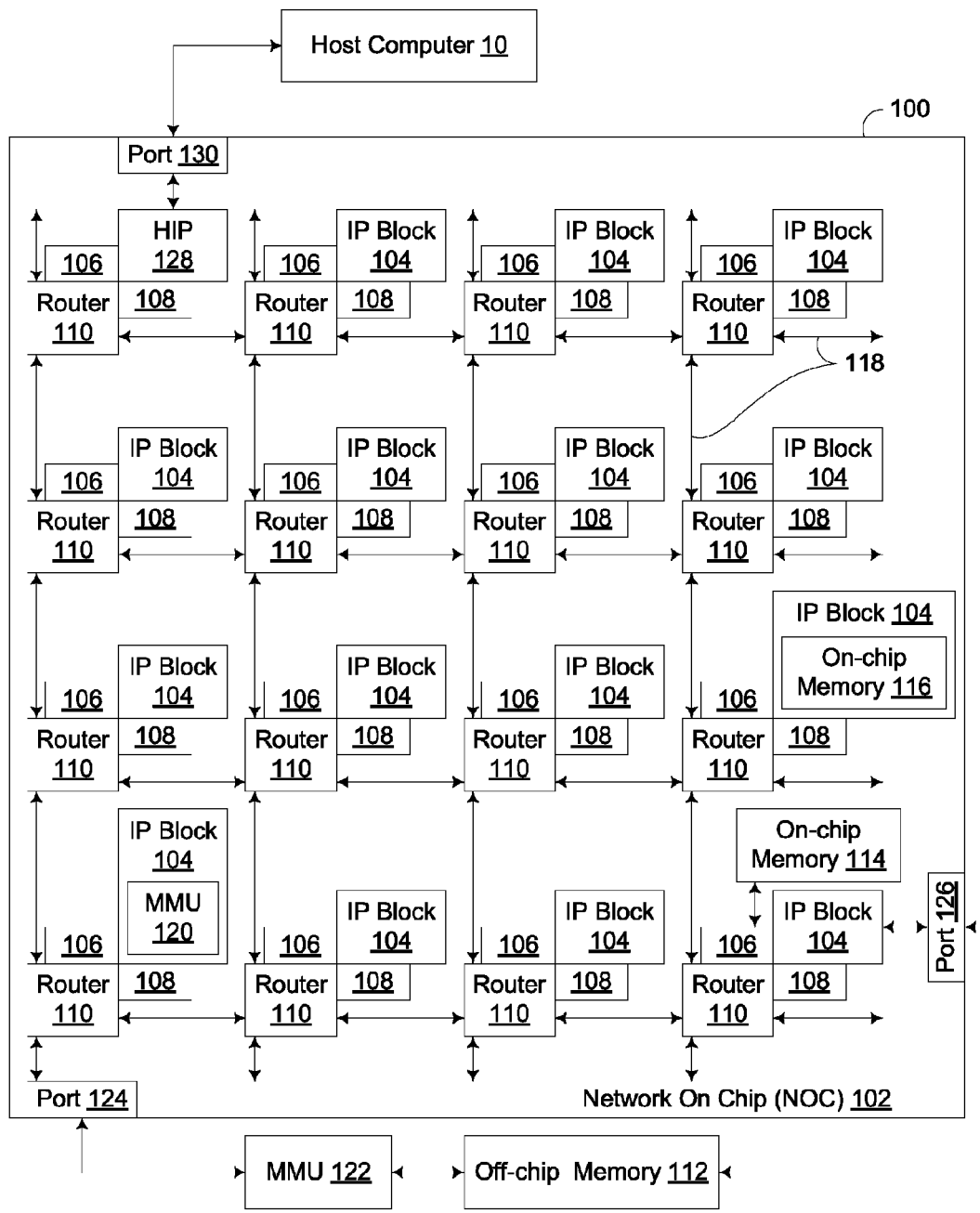
FIG. 2 is a block diagram illustrating in greater detail an exemplary implementation of the processor in FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
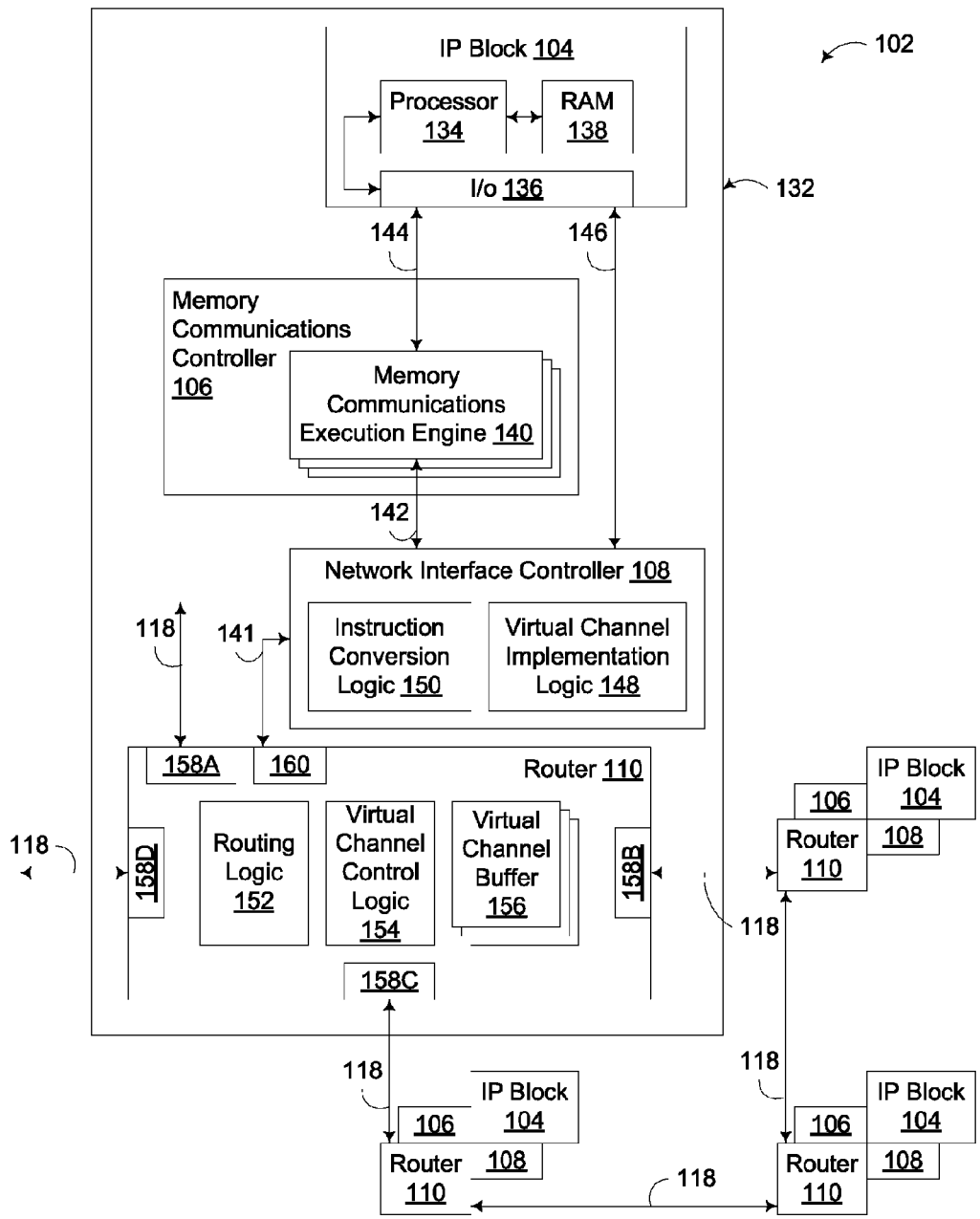
FIG. 3 is a block diagram illustrating an exemplary implementation of an auxiliary instruction issue and execution logic consistent with the invention, and capable of being implemented within the processor of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
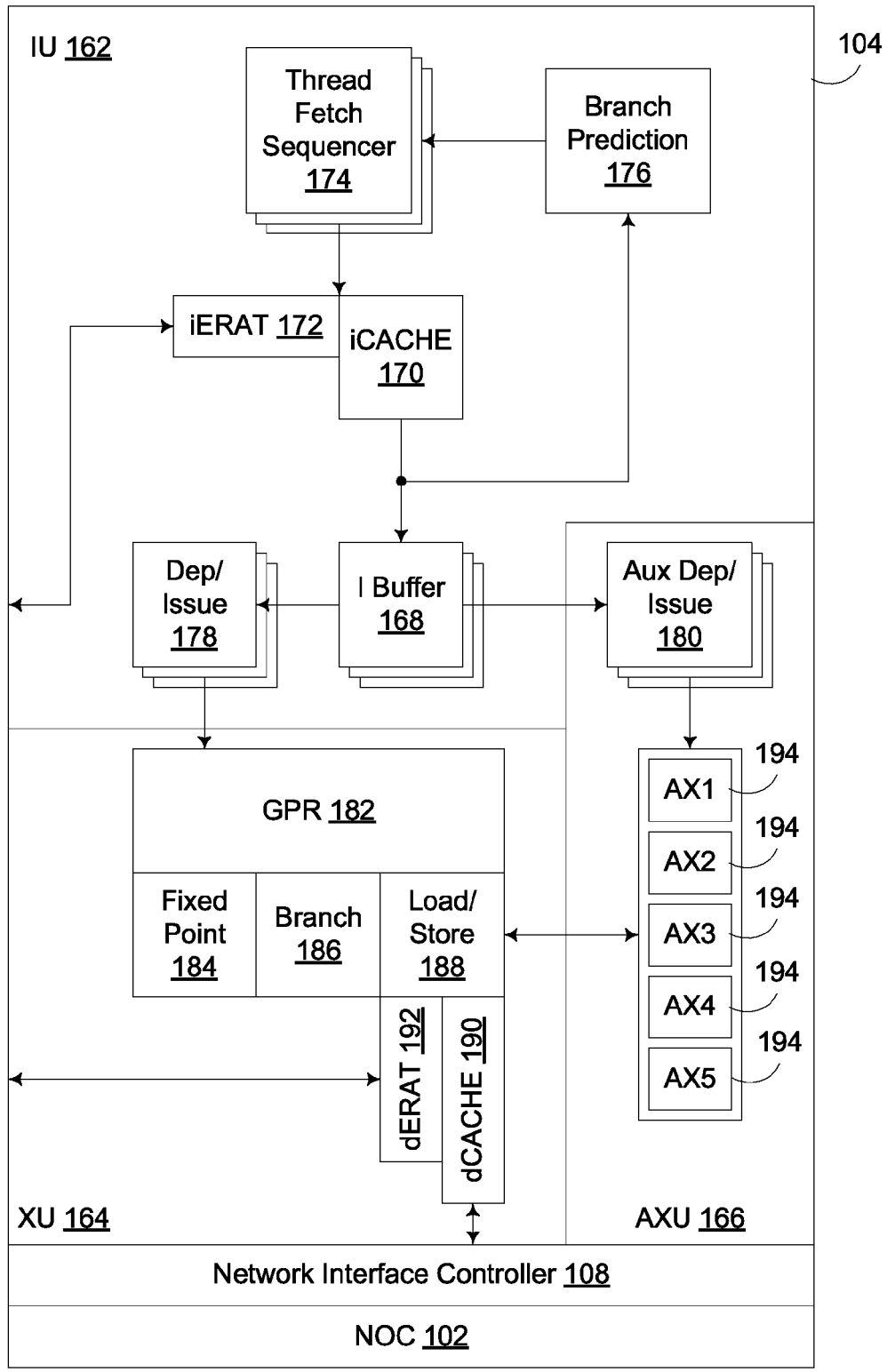
FIG. 4 is a state diagram of an address sequence detection logic consistent with the invention, and capable of being implemented within the processor of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Figure 5:
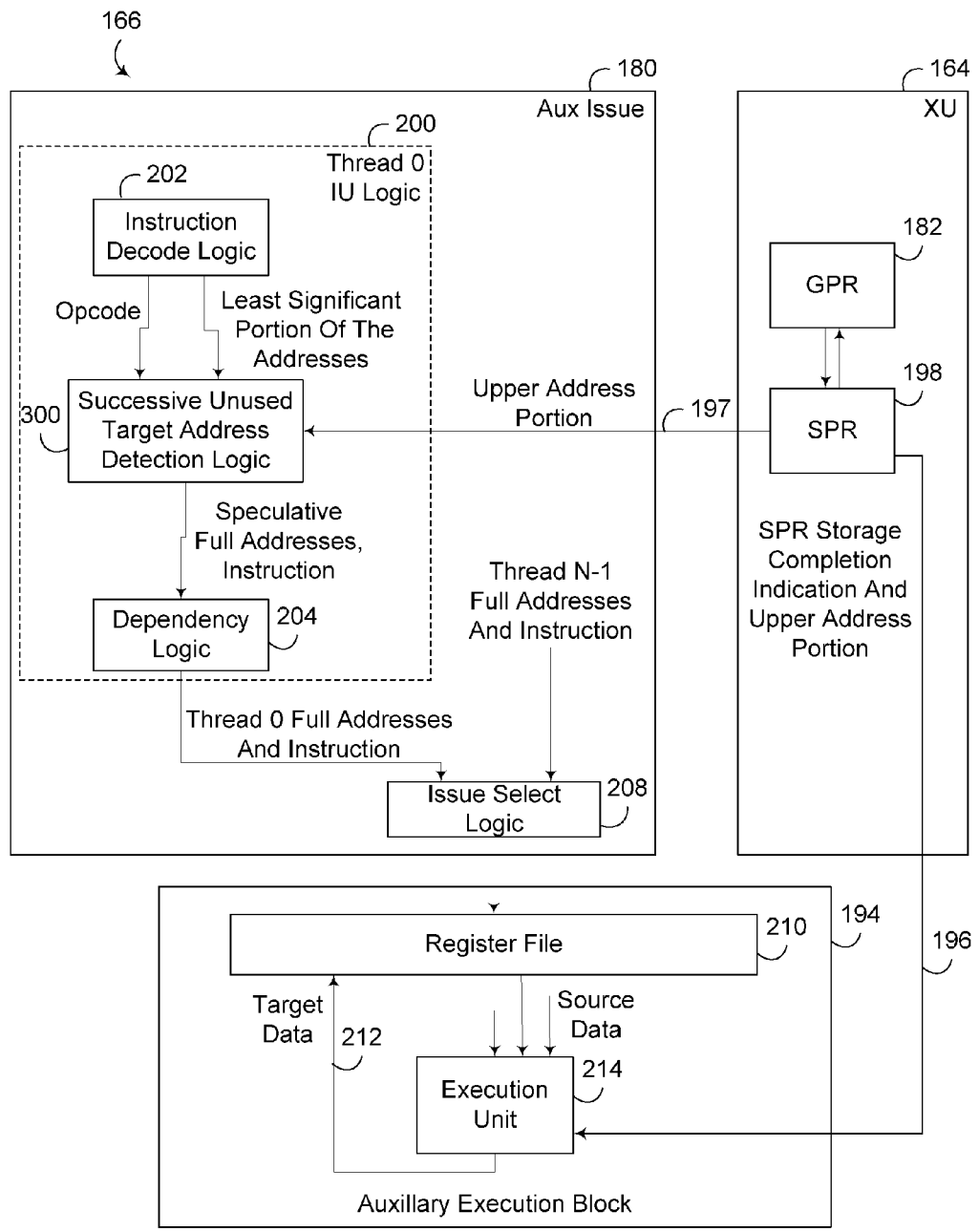
FIG. 5 is a block diagram illustrating an exemplary implementation of an auxiliary instruction issue and execution logic consistent with the invention and suitable for implementation inside the processing unit of FIG. 3.

Opcode Expansion and/or Determination in Response to Successive Target Address Detection FIG. 5 illustrates in further detail an exemplary AXU 166 suitable for implementation inside the processing unit 134 of FIG. 3. Returning to FIG. 5, AXU 166 is configured with the dependency/issue logic 180, which is configured to select fair issuance of instructions from multiple threads using an issue select logic 208, which in turn issues instructions from the selected thread to an auxiliary execution block 194. AXU 166 is also configured to decode instructions for each thread with an instruction decode logic 202. Instruction decode logic 202 decodes instructions from its associated thread to determine if the current instruction supports operational code ("opcode") expansion consistent with embodiments of the invention. If so, instruction decode logic 202 obtains one or more target address portions from the instruction and provides them to successive unused target address detection logic 300. Successive unused target address detection logic 300 is configured to detect if the target address of an instruction has also been used as a target address by one or more previously decoded instructions without being used as a source address, decoding a first opcode of the instruction as a second opcode different from the first opcode when the target address of the instruction has been used as a target address by one or more previously decoded instructions without being used as a source address, and providing the decoded instruction to dependency logic 204. Successive unused target address detection logic 300 is further configured to obtain a portion of a full address not contained in the instruction (such as a portion of a target or source address that is shortened in the address) from SPR 198 via high speed communication bus 197. Dependency logic 204 is configured to resolve dependencies between instructions, and pass the instruction and associated full addresses to issue select logic 208.

Issue select logic 208 is configured to select fair issuance of instructions from available threads in the design, and issue instructions and full register addresses to auxiliary execution block 194. Auxiliary execution block 194 includes a register file 210 coupled to an execution unit 214. Register file 210 includes an array of registers, each of which are accessed by a unique address. For example, register file 210 may be implemented to support 64 registers, each accessed by a unique full 6 bit address. It will be appreciated that different numbers of registers may be supported in different embodiments.

Auxiliary execution block 194 is configured to obtain the full addresses from issue select logic 208, and provide them to register file 210, which in turn reads operand data associated with the full address, and provides the operand data to execution unit 214. Execution unit 214 may be implemented as a number of different types of execution units, e.g., floating point units, fixed point units, or specialized execution units such as graphics processing units, encryption/decryption units, coprocessors, XML processing units, etc, and still remain within the scope and spirit of the present invention.

Execution unit 214 performs some operation on this operand data e.g., addition, subtraction, division, etc., depending on the type of instruction issued from issue select logic 208, which in turn is based on the opcode included in the instruction. Execution unit 214 provides the resultant target data 212 from the operation back to register file 210, where it is stored internally at a location associated with a target address specified by an instruction. Execution unit 214 is further configured to receive an indication from SPR 198 through high speed communication bus 196 as to whether or not an instruction has been completed that has moved a value into SPR 198 that matches speculative values being used by execution unit 214. Execution unit 214 is configured to prevent completion of any instruction that is using an incorrect speculative address, such that data will be prevented from being written into an incorrect address location in register file 210.

In a multithreaded design consistent with the invention, one group 200 of instruction decode logic 202, successive unused target address detection logic 300, and dependency logic 204 exists for each thread in the design. Alternatively, other embodiments may be implemented in a single threaded design, where only a single thread is issued to one group 200 of instruction decode logic 202, sequence detection logic 300, and dependency logic 204, and only one group 200 exists in the design.

Figure 6:
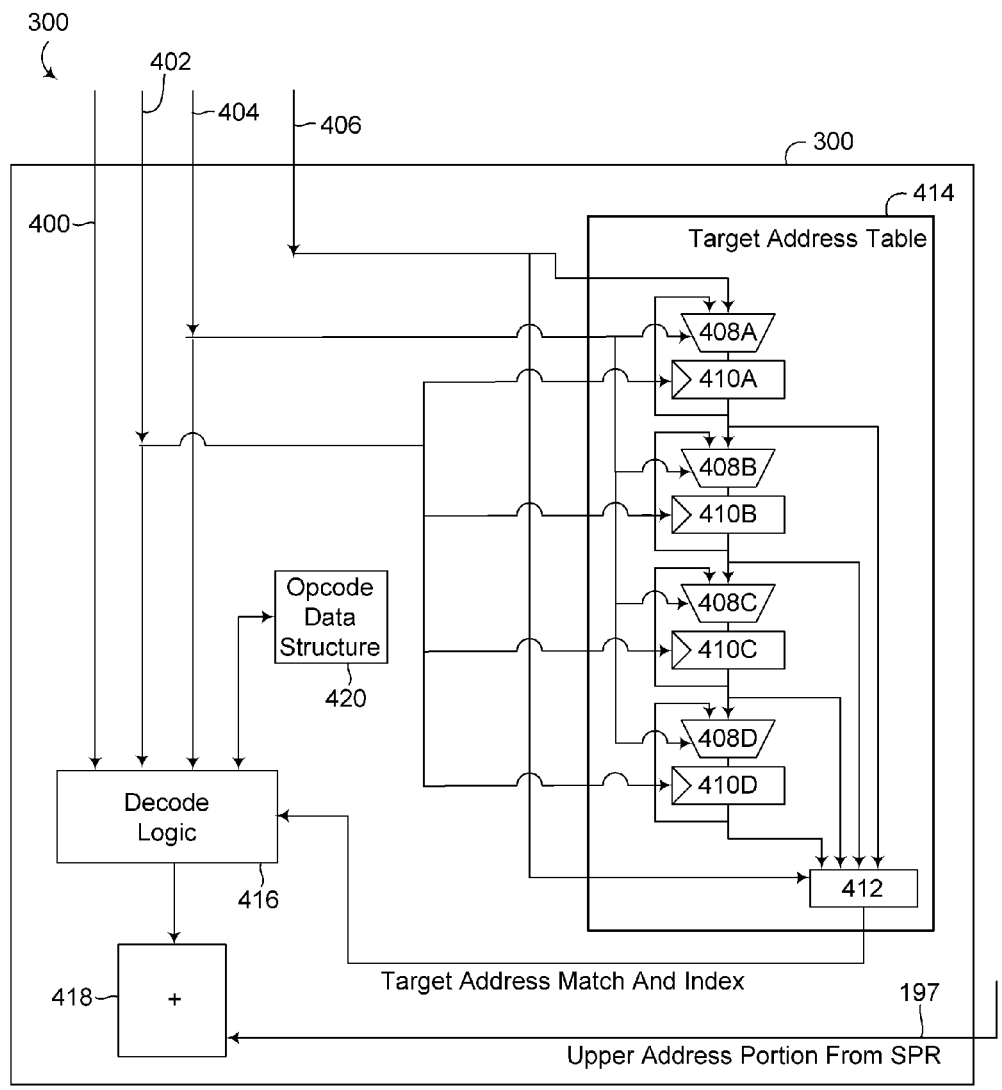
FIG. 6 is a block diagram illustrating in greater detail the successive unused target address detection logic of FIG. 5.

FIG. 6 illustrates in further detail the successive unused target address detection logic 300, previously illustrated in FIG. 5. With respect to FIG. 6, successive unused target address detection logic 300 data associated with an instruction for analysis, including the opcode of the instruction as at 400, one or more source addresses of the instruction as at 402, a target address as at 404, and additional data indicating that the target address is valid, not used as a source, and that the opcode of the instruction associated with the target address is valid as at 406. The successive unused target address detection logic 300, in turn, provides that data to a target address history table 414. Target address history table 414 is configured to receive the target address associated with the current instruction and provide it as an input to multiplexer 408A. Target address history table 414 is also configured to receive the additional data (indicating that the target address is valid, not used as a source, and that the opcode of the instruction associated with the target address is compatible to be analyzed with respect to successive target address detection consistent with embodiments of the invention) and provide it as a selector input to multiplexers 408A-408D. Multiplexer 408A is coupled to latch 410A and is configured to provide as input to latch 410a either the output of latch 410A if the additional data is not asserted, or the current target address if the additional data is asserted. Latches 410A-410D each feed back into multiplexers 408A-408D, in such manner that if the current additional data is inactive (or not true), meaning the current instruction is invalid or does not write to the register file, then target address table latches 410A-410D hold their previous state. If the additional data is active (or true), the target addresses held in latches 410A-410D advance down the table. If any of the source addresses fed into a latche 410A-D matches a target address held in that latch 410A-D, the latch clears.

Target addresses advance down the target address history table 414 in a manner such that when a target address is specified by an instruction and valid, the target address in latch 410A proceeds into latch 410B, and the target address in latch 410B proceeds to latch 410C, and the target address in latch 410C proceeds to latch 410D. Target addresses from the latches 410A-D are coupled to the input of target address detection logic 412. The target address detection logic 412 performs a logical AND with the target address of the instruction being analyzed and each of the target addresses output by latches 410A-D. The target address detection logic 412 then logically OR's the values from each of the logical AND operations. If a target address has been used as a target address by one or more previously decoded instructions as tracked by the target address table 414 and that target address has not been used as a source address by the one or more previously decoded instructions, the output of the target address detection logic 412 will be the target address of the instruction being analyzed as well as an index indicating how many instructions have passed since the target address of the instruction being analyzed was last used as a target address. However, if a target address has not been used by one or more previously decoded instructions as tracked by the target address table 414 or that target address has been used as a source address by the one or more previously decoded instructions, the output of the target address detection logic 412 is clear, or otherwise indicates that the target address has not been used by one or more previously decoded instructions or has been used as a source by the one or more previously decoded instructions. In some embodiments, and as illustrated in FIG. 6, it will be appreciated that the target address table 414 may track the target addresses specified by the four most recent instructions. Alternatively, the target address table 414 may track more or fewer instructions as will be appreciated by those skilled in the art. Moreover, it will be appreciated by those skilled in the art that a separate target address table 414 may exist for each thread in a multithreaded design.

In any event, decode logic 416 receives the output of the target address detection logic 412. When the output from the target address detection logic 412 is clear or otherwise indicates that the target address of the instruction being analyzed has not previously been used by an instruction tracked by the target address table 414 without being first used as a source address, the successive unused target address detection logic 300 combines the opcode and addresses of the instructions in the decode logic 416 and adds any upper address bits for the addresses at 418 before outputting the instruction to the dependency logic 204.

When the address detection logic indicates that the target address of the instruction being analyzed has been used by one or more previously decoded instructions tracked by the target address table 414 without being first used as a source address, the decode logic 416 decodes an opcode of the instruction being analyzed as a second, different opcode. In some embodiments, the decode logic 416 accesses an opcode data structure 420, which may be configured as a table, to identify the second, different opcode. In particular, the opcode data structure 420 may include multiple entries that are categorized by a target address. When the decode logic 416 receives a target address from the address detection logic 412, it accesses the opcode data structure 420 for an entry that matches the target address. When the opcode data structure 420 includes an entry that matches the target address, the opcode data structure 420 returns an opcode to use as the second, different opcode for the instruction being analyzed.

In alternative embodiments, the opcode data structure 420 may include multiple entries that are categorized by both a combination of a target address and at least a portion of an opcode. Thus, when the decode logic 416 receives a target address from the address detection logic 412, it accesses the opcode data structure 420 for an entry that matches the target address and at least a portion of the opcode of the instruction being analyzed. When the opcode data structure 420 includes an entry that matches the target address and the at least a portion of the opcode of the instruction being analyzed, the opcode data structure 418 returns an opcode to use as the second, different opcode for the instruction being analyzed.

In further alternative embodiments, the opcode data structure 420 may include multiple entries that are categorized by an indication of the number of instructions between an instruction being analyzed and the last instruction in the target address table 414 to use that target address (i.e., the depth of the table). In these embodiments, the opcode data structure 420 may be accessed by the decode logic 416 for an entry that matches the depth, at least a portion of the target address, and/or at least a portion of the opcode of the instruction. Still further, an indication of the number of instructions between the instruction being analyzed and the last instruction to use the target address may be used to determine the second, different opcode, whether or not used in conjunction with the target address or the combination of the target address and at least a portion of the first opcode.

When the opcode data structure 420 does not include an entry that matches the target address or a combination of the target address and at least a portion of the opcode of the instruction being analyzed, the decode logic 416 may simply prepare the instruction for execution with the original opcode thereof.

The decode logic 416 further determines whether an instruction includes an opcode that is compatible with successive target address detection consistent with embodiments of the invention. For example, incompatible opcodes may include opcodes that are source destructive (i.e., opcodes that use an address as both a source and a target address), opcodes that do not include a target address (i.e., opcodes that operate to set a flag without specifying the target address for the flag), or opcodes that should otherwise not have the target addresses referenced thereby analyzed. The determination of whether an opcode is compatible with successive target address detection may be made with respect to an analysis of the opcode or the additional data included with the target address of the opcode (e.g., the data indicating that the opcode of the instruction associated is compatible to be analyzed with respect to successive target address detection consistent with embodiments of the invention). When an instruction includes an opcode that is not compatible with successive target address detection consistent with embodiments of the invention, the decode logic 416 combines the opcode and addresses of the instruction, and any upper address bits for the addresses are added at 418 before outputting the instruction to the dependency logic 204.

Returning to FIG. 5, auxiliary execution unit 166 includes register file 210 coupled to execution pipeline 212. Register file 210 includes an array of registers, each of which are accessed by a unique address. For example, register file 210 may be implemented to support 64 registers, each accessed by a unique 6 bit address. It will be appreciated that different numbers of registers may be supported in different embodiments. Register file 210, in response to receiving source register addresses from multiplexer 412, will read operand data contained in the register file entries associated with the source register addresses and provide the required operand data to the execution pipeline 212.

Execution pipeline 212, in response to operand data received from register file 210, performs mathematical, logical or other operations on one or more source operands retrieved from selected registers in register file 210. For example, execution pipeline 212 receives a source operand from register file 210, and may store a result data back into register file 210, e.g., in the form of a target written to a register in the register file associated with the target address from execution unit decode logic 214. Execution pipeline 212, i.e., execution logic, may be implemented as a number of different types of execution units, e.g., floating point units, fixed point units, or specialized execution units such as graphics processing units, encryption/decryption units, coprocessors, XML processing units, etc.

Figure 7:
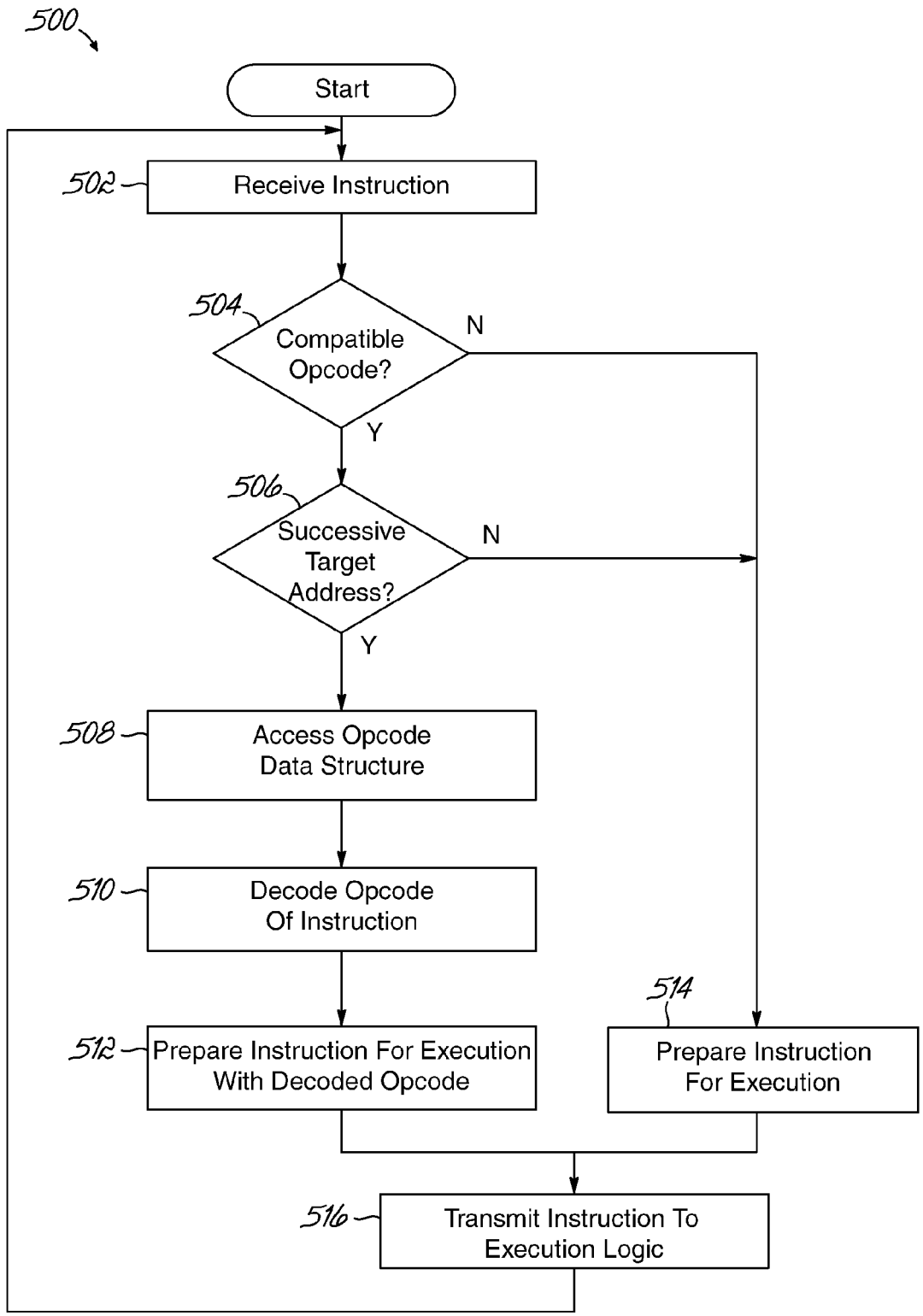
FIG. 7 is a flowchart illustrating an exemplary sequence of operations performed by the auxiliary instruction issue and execution logic of FIG. 5 to perform selective modification of an instruction consistent with embodiments of the invention.

FIG. 7 is a flowchart 500 illustrating a sequence of operations to perform selective modification of an instruction consistent with embodiments of the invention. In some embodiments consistent with the invention, a second instruction is analyzed to determine if the second instruction utilizes a particular address as a target address, where the particular address was also utilized as a target address for a previously decoded instruction (i.e., a first instruction) without being utilized as a source address by any instructions in between the first instruction and the second instruction in the instruction stream.

In particular, an instruction that includes an opcode (a first opcode) and at least one operand (e.g., a target address and/or one or more source addresses) may be received by detection logic consistent with embodiments of the invention, including for example, the successive unused target address detection logic 300 shown in FIG. 6 (block 502). In some embodiments, the detection logic analyzes the received instruction to determine whether the instruction and/or opcode of the instruction are compatible with successive target address detection (block 504).

In response to determining that the instruction is compatible with successive target address detection ("Yes" branch of decision block 504), the detection logic may analyze the received instruction to determine whether the target address of the received instruction has been used as a target address by one or more previously decoded instructions without being utilized as a source address (block 506). In some embodiments, a target address table, including for example, the target address table 414 shown in FIG. 6, may include data indicating one or more target addresses of previously decoded instructions, and determining whether the target address of the received instruction has been used as a target address by one or more previously decoded instructions without being utilized as a source address may be based at least in part on the data included in the target address table.

In response to determining that the target address of the received instruction has been used as a target address by one or more previously decoded instructions without being utilized as a source address ("Yes" branch of decision block 506), the detection logic may access an opcode data structure to determine an entry indicated by the received instruction (block 508). In some embodiments, the opcode data structure (e.g., the opcode data structure 420 of FIG. 6), may include one or more entries, where each entry may be associated with an address, opcode, and/or the depth between the received instruction and the previously decoded instruction that targeted the same address, and in these embodiments, the detection logic may access the opcode data structure to retrieve data of an entry indicated by the received instruction, where an entry may be indicated by the received instruction based at least in part on the target address, the opcode of the received instruction, and/or the depth. The data associated with the indicated entry may include, for example, a secondary opcode to be inserted in the received instruction, which thereby changes the opcode of the received instruction into a different opcode, a portion of an opcode to be added to the opcode of the received instruction, a second opcode to be executed in place of the opcode included with the received instruction, and/or other such data which facilitates expansion of an opcode prior to execution.

In some embodiments, decode logic decodes the opcode of the received instruction (block 510). In some embodiments, the decode logic, including for example, the decode logic 416 of FIG. 6, decodes the opcode of the received instruction (the "first opcode") as a different opcode (the "second opcode"). In some embodiments, the decode logic receives data associated with an entry of the opcode data structure and the decode logic decodes the first opcode as a second opcode based at least in part on the data associated with the entry of the opcode data structure. In some embodiments, the data associated with the entry may indicate a secondary opcode which identifies a unique instruction type different from the first opcode, which thereby changes the first opcode to a second opcode, where the second opcode may be a combination of the first opcode and the secondary opcode. In some embodiments, the data associated with the entry may indicate the second opcode, and in these embodiments, the decode logic may decode the first opcode as the second opcode by replacing the first opcode with the second opcode indicated by the data. In some embodiments, the data associated with the entry may indicate a portion of an opcode, and in these embodiments, the decode logic may decode the first opcode as the second opcode by appending the portion of the opcode to the first opcode, thereby changing the first opcode to a second opcode. In some embodiments, the data associated with an entry may indicate a value and/or logical operation to perform on the first opcode, and in these embodiments, the decode logic may decode the first opcode as the second opcode by performing a logical operation with the value and/or by performing a logical operation without the value on the first opcode. The detection logic prepares the received instruction for execution with the decoded opcode (i.e., the second opcode) (block 512). In some embodiments, preparing the received instruction for execution may include appending one or more address bits to the target address and/or source addresses indicated by the instruction, where the one or more address bits may be determined by the detection logic based at least in part on the received instruction.

In response to determining that the instruction and/or opcode of the instruction are not compatible with successive target address detection ("No branch of decision block 504), or in response to determining that the target address of the received instruction has not been used as a target address by one or more previously decoded instructions without being utilized as a source address ("No" branch of decision block 506), the detection logic may prepare the received instruction for execution). As opposed to the instruction prepared for execution in block 512, the received instruction is not modified (block 514), such that the received instruction is prepared for execution as received.

Following preparation of the instruction for execution in block 512 or block 514, the detection logic may transmit the instruction to execution logic, including for example, execution unit 214 of FIG. 5 (block 516).

Embodiments of the invention are also configured to execute an instruction when it does not include an opcode that is compatible for selective opcode decoding in response to successive target address detection, or an instruction with a target address specified thereby was not used by one or more previous instructions without first being used as a source address.

By way of example, an instruction stream may contain at least two instructions. A first instruction is formatted as "FADD add1, add2, add3," in which "FADD" is the primary opcode, "add1" is a target address, while "add2" and "add3" are source addresses. The first instruction is executed to add the values in add2 and add3, then store that computed value at add1. A second instruction that is received after the first instruction is formatted as "FADD add1, add4, add5, add6," in which "FADD" is the primary opcode, "add1" is the target address, while "add4," "add5," and "add6" are the source addresses. The second instruction would normally be executed to add the values in add4, add5, and add6, then store the computed value at add1.

In this example, embodiments consistent with the invention detect that the target address for the first and the second instructions is the same without being used as a source address therebetween. Thus, embodiments of the invention are configured to add a secondary opcode to the second instruction. Specifically, at least a portion of the target address and/or at least a portion of the primary opcode are provided to, or searched for in, an opcode data structure. When an entry matches the provided at least a portion of the target address, the provided at least a portion of the primary opcode or the combination, the secondary opcode specified by the data of the entry is added to the second instruction. Thus, the second instruction includes the secondary opcode, where the secondary opcode, in conjunction with the primary opcode may indicate a specific operation to be performed, as such, the opcode of the second instruction is decoded as a different opcode by the combination of the primary opcode and the determined secondary opcode. More specifically, in this example, the primary opcode and the secondary opcode may be determined to be "FMADD." As such, the second instruction is decoded as "FMADD add1, add4, add5, add6," which is executed to multiply the values in add4 and add5, add that value of the multiplication to the value in add6, and store the computed value at add1. As a sub-example, the second instruction may be decoded as "FMADD add4, add5, add6, which is executed to multiply the values in add4 and add5, add that value of the multiplication to the value in add6, and store the computed value at add4. As such, the second instruction is decoded as a "source-destructive" operation.

Also by way of example, an instruction stream may contain three instructions. A first instruction is formatted as "FADD add1, add2, add3," in which "FADD" is the primary opcode, "add1" is a target address, while "add2" and "add3" are source addresses. The first instruction is executed to add the values in add2 and add3, then store that computed value at add1. A second instruction is received immediately after the first instruction and formatted as "FDIV add4, add5, add6," in which "FDIV" is the primary opcode, "add4" is the target address, while "add5" and "add6" are the source addresses. The second instruction is executed to divide the value in add5 by the value in add6, then store that computed value at add4. A third instruction is received immediately after the second instruction and formatted as "FDIV add1, add7, add8," in which "FDIV" is the primary opcode, "add1" is the target address, while "add7," and "add8" are the source addresses. The third instruction would normally be executed to divide the values in add7 by the value in add8, then store that computed value at add1, then store the computed value at add1.

In this example, embodiments consistent with the invention detect that the target addresses for the first and the third instructions is the same without being used as a source address therebetween (i.e., without being used as a source address by the second instruction). Thus, embodiments of the invention are configured to decode a second opcode for the third instruction, where the second opcode is different from the first opcode included in the third instruction. Specifically, the target address, at least a portion of the primary opcode, and/or an indication of the number of instructions between the first and third instruction (i.e., one) are provided to, or searched for in, an opcode data structure. When an entry matches that data, the data specified by that entry may be utilized to decode the opcode included in the third instruction. Thus, the third instruction may be executed with the decoded opcode (i.e., second opcode). More specifically, in this example, the second opcode may be determined to be "FMSUB." As such, the second instruction is decoded as "FMSUB add1, add7, add8," which is executed to multiply the values in add1 and add7, subtract the value in add8 from the value of the multiplication, and store the computed value at add1. As such, the third instruction is decoded as a "source-destructive" operation.

Embodiments of the present invention may be implemented within the hardware and software environment described above in FIGS. 1-7. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. Moreover, while in some embodiments a compiler compiling program code may generate instruction streams consistent with the invention, in some embodiments, the invention is not so limited. For example, in some embodiments of the invention, an instruction stream consistent with embodiments of the invention may be generated on the fly to thereby expand an/or compress opcodes in one or more instructions of the instruction stream. As such, the invention is not limited to the particular hardware and software environment disclosed herein.

Other modifications will be apparent to one of ordinary skill in the art having the benefit of the instant disclosure. Therefore, the invention lies in the claims hereinafter appended.

What is claimed is:

1. A method of executing instructions in an instruction stream comprising:
   receiving a first instruction of the instruction stream, the first instruction utilizing a respective address as a target address;
   in response to determining that a second instruction occurring later than the first instruction in the instruction stream utilizes the respective address as a target address without the respective address being utilized as a source address between the first instruction and the second instruction, decoding a first opcode identified by the second instruction to change the first opcode to a second opcode for the second instruction that is different from the first opcode.

2. The method of claim 1, further comprising:
   executing the second instruction with the second opcode and with the respective address being utilized as the target address of the second instruction.

3. The method of claim 1, further comprising:
   executing the second instruction with the second opcode and without the respective address being utilized as the target address of the second instruction.

4. The method of claim 1, wherein decoding the first opcode identified by the second instruction to change the first opcode to the second opcode that is different from the first opcode includes determining the second opcode based at least in part on the first opcode.

5. The method of claim 1, wherein decoding the first opcode identified by the second instruction to change the first opcode to the second opcode that is different from the first opcode includes determining the second opcode based at least in part on the respective address.

6. The method of claim 1, wherein decoding the first opcode identified by the second instruction to change the first opcode to the second opcode that is different from the first opcode includes:
   determining a secondary opcode identified by the second instruction, and
   determining the second opcode based at least in part on the first opcode and the secondary opcode.

7. The method of claim 1 further comprising:
   prior to decoding the first opcode identified by the second instruction to change the first opcode to the second opcode that is different from the first opcode, searching an opcode data structure based at least in part on the second instruction to identify an entry of the opcode data structure, and
   wherein decoding the first opcode to change the first opcode to the second opcode is based at least in part on data associated with the entry.

8. The method of claim 7, further comprising:
   in response to receiving the second instruction, determining whether the target address of the second instruction matches an entry in the data structure.

9. The method of claim 1, further comprising:
   in response to determining that the respective address has been utilized as a source address after execution of the first instruction and prior to execution of the second instruction, executing the second instruction with the first opcode.

10. The method of claim 1 further comprising:
    in response to executing the first instruction, storing data indicating the respective address as an entry in a data structure.

11. A circuit arrangement comprising:
    execution logic configured to receive a first instruction in an instruction stream, the first instruction utilizing a respective address as a target address;
    detection logic coupled to the execution logic configured to decode a first opcode identified by a second instruction occurring later in the instruction stream than the first instruction to change the first opcode to a second opcode for the second instruction that is different from the first opcode in response to determining that the second instruction utilizes the respective address as a target address without the respective address being utilized as a source address between the first instruction and the second instruction.

12. The circuit arrangement of claim 11, wherein the execution logic is further configured to execute the second instruction with the second opcode and with the respective address being utilized as the target address of the second instruction.

13. The circuit arrangement of claim 11, wherein the execution logic is further configured to execute the second instruction with the second opcode and without the respective address being utilized as the target address of the second instruction.

14. The circuit arrangement of claim 11, wherein the execution logic is further configured to execute the second instruction with the first opcode in response to the detection logic determining that the respective address has been utilized as a source address between execution of the first instruction and receipt of the second instruction.

15. The circuit arrangement of claim 11, further comprising:
   an opcode data structure coupled to the detection logic including at least one entry,
   wherein the detection logic is further configured to access the opcode data structure to search the opcode data structure based at least in part on the second instruction to identify an entry of the opcode data structure, and
   wherein decoding the first opcode to change the first opcode to the second opcode is based at least in part on data associated with the identified entry.

16. The circuit arrangement of claim 11, further comprising:
   a data structure coupled to the execution logic and the detection logic, and wherein the execution logic is further configured to store data indicating the respective address as an address in the data structure in response to executing the first instruction.

17. The circuit arrangement of claim 16, wherein the detection logic is further configured to access the data structure to determine whether the target address of the second instruction matches an entry in the data structure in response to receiving the second instruction.

18. The circuit arrangement of claim 11, wherein the detection logic being configured to decode the first opcode to change the first opcode to the second opcode is based at least in part on the respective address.

19. The circuit arrangement of claim 11, wherein the detection logic being configured to decode the first opcode to change the first opcode to the second opcode is based at least in part on the first opcode.

20. The circuit arrangement of claim 11, wherein the detection logic being configured to decode the first opcode to change the first opcode to the second opcode includes the detection logic being further configured to determine a secondary opcode identified by the second instruction, and wherein the detection logic is further configured to insert the secondary opcode in the second instruction.

21. A program product comprising a computer readable medium and logic definition program code resident on the computer readable medium and defining the circuit arrangement of claim 11.

22. An integrated circuit comprising the circuit arrangement of claim 11.

* * * * *